United States Patent
Drews et al.

(10) Patent No.: US 8,304,366 B2
(45) Date of Patent: Nov. 6, 2012

(54) SYSTEM FOR REMEDIATING EMISSIONS AND METHOD OF USE

(75) Inventors: Andrew Robert Drews, Ann Arbor, MI (US); Robert J. Kudla, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/953,711

(22) Filed: Nov. 24, 2010

(65) Prior Publication Data

US 2011/0165046 A1    Jul. 7, 2011

(51) Int. Cl.
- B01J 23/00    (2006.01)
- B01J 21/00    (2006.01)
- B01D 50/00    (2006.01)
- B01D 53/34    (2006.01)

(52) U.S. Cl. ........ 502/327; 502/262; 502/302; 502/303; 502/304; 502/326; 502/332; 502/333; 502/334; 502/339; 502/349; 502/350; 502/351; 502/355; 502/407; 502/415; 502/439; 502/527.12; 502/527.13; 422/177; 422/180

(58) Field of Classification Search .................. 502/262, 502/302–304, 326, 327, 332–334, 339, 349–351, 502/355, 407, 415, 439, 527.12, 527.13; 422/170–180
See application file for complete search history.

(56) References Cited

U.S. PATENT DOCUMENTS

| | | | |
|---|---|---|---|
| 5,772,972 A * | 6/1998 | Hepburn et al. ........... | 423/213.5 |
| 6,293,096 B1 | 9/2001 | Khair et al. | |
| 6,517,785 B2 * | 2/2003 | Noda et al. .................... | 422/180 |
| 6,613,299 B2 * | 9/2003 | Dang et al. ................. | 423/239.1 |
| 6,649,559 B2 * | 11/2003 | Drost et al. .................... | 502/182 |
| 6,846,466 B2 * | 1/2005 | Matsumoto et al. .......... | 422/180 |
| 7,067,454 B2 * | 6/2006 | Raybould ...................... | 502/320 |
| 7,189,376 B2 * | 3/2007 | Kumar et al. ................. | 422/177 |
| 7,229,597 B2 * | 6/2007 | Patchett et al. ............... | 422/177 |
| 7,276,212 B2 * | 10/2007 | Hu et al. ........................ | 422/177 |
| 7,384,612 B2 * | 6/2008 | Ajisaka et al. ................ | 422/177 |
| 7,481,983 B2 * | 1/2009 | Patchett et al. ............... | 422/180 |
| 7,485,270 B2 | 2/2009 | Twigg et al. | |
| 7,517,510 B2 * | 4/2009 | Chen et al. ................. | 423/213.2 |
| 7,550,117 B2 * | 6/2009 | Alward et al. ................ | 422/177 |
| 7,550,124 B2 * | 6/2009 | Chen et al. ................. | 423/213.2 |
| 7,572,416 B2 * | 8/2009 | Alward et al. ................ | 422/180 |
| 7,622,096 B2 * | 11/2009 | Deeba et al. ............... | 423/213.2 |
| 7,625,529 B2 * | 12/2009 | Ohno et al. .................... | 422/180 |
| 7,678,347 B2 * | 3/2010 | Chen .............................. | 422/180 |
| 7,704,473 B2 * | 4/2010 | Ikeda et al. ................. | 423/213.2 |
| 7,785,544 B2 * | 8/2010 | Alward et al. ................ | 422/179 |

(Continued)

FOREIGN PATENT DOCUMENTS

WO    2006083750 A2    8/2006

(Continued)

Primary Examiner — Cam N. Nguyen
(74) Attorney, Agent, or Firm — Damian Porcari; Brooks Kushman P.C.

(57) ABSTRACT

One aspect of the present invention relates to a system for remediating emissions using a hybrid oxidation catalyst system. The hybrid oxidation catalyst system includes a noble metal oxidation catalyst having noble metal particles in a first ceramic layer. The system also includes a base metal oxide catalyst disposed in a second ceramic layer situated downstream of the noble metal oxidation catalyst. The noble metal oxidation catalyst is effective to substantially prevent hydrocarbon or carbon monoxide inhibition of the base metal oxide catalyst when enhancing the $NO+O_2$ conversion effectiveness of the base metal oxide catalyst.

19 Claims, 4 Drawing Sheets

U.S. PATENT DOCUMENTS

| | | | |
|---|---|---|---|
| 7,875,572 B2 * | 1/2011 | Kikuhara et al. | 502/302 |
| 7,922,977 B2 * | 4/2011 | Xu et al. | 422/170 |
| 7,922,988 B2 * | 4/2011 | Deeba et al. | 423/213.2 |
| 7,976,784 B2 * | 7/2011 | Liu et al. | 422/177 |
| 7,985,380 B2 * | 7/2011 | Bruck | 422/180 |
| 2003/0092567 A1 * | 5/2003 | Tanaka et al. | 502/302 |
| 2003/0171217 A1 * | 9/2003 | Koike et al. | 502/439 |
| 2004/0166340 A1 * | 8/2004 | Cairns et al. | 428/472 |
| 2004/0202589 A1 * | 10/2004 | Raybould | 422/177 |
| 2007/0258882 A1 * | 11/2007 | Castellano et al. | 423/648.1 |
| 2008/0038172 A1 | 2/2008 | Chen et al. | |
| 2008/0229731 A1 * | 9/2008 | Kikuhara et al. | 60/299 |
| 2010/0303677 A1 * | 12/2010 | Henry et al. | 422/171 |

FOREIGN PATENT DOCUMENTS

| | | |
|---|---|---|
| WO | 2008006427 A1 | 1/2008 |

* cited by examiner

SYSTEM FOR REMEDIATING EMISSIONS AND METHOD OF USE

BACKGROUND

1. Field of the Invention

One aspect of the present invention relates to a system for remediating emissions and its method of use.

2. Background Art

Emissions of regulatory concern include oxides of nitrogen. The oxides of nitrogen include, but are not limited to, nitric oxide, NO, and nitrogen dioxide, $NO_2$. These compounds are frequently referred to as NOx as prescribed by the United States Environmental Protection Agency.

Treatment systems have been proposed to remediate NOx in the emissions from diesel and other lean-burn engines but are generally relatively expensive.

SUMMARY

One aspect of the present invention relates to a system for remediating emissions and its method of use. The system includes a hybrid oxidation catalyst system. The hybrid oxidation catalyst system includes a noble metal oxidation catalyst having noble metal particles in a ceramic layer. The hybrid oxidation catalyst system also includes a base metal oxide catalyst disposed downstream of the noble metal catalyst. The base metal oxide catalyst includes transition metal oxide particles in a ceramic layer. The noble metal oxidation catalyst is effective to substantially prevent hydrocarbon inhibition of the base metal oxide catalyst when enhancing the $NO+O_2$ conversion effectiveness of the base metal oxide catalyst.

In another embodiment, the hybrid oxidation catalyst system includes a first catalyst comprising palladium particles in a first ceramic layer supported on a first substrate. The first catalyst is capable of oxidizing hydrocarbons and carbon monoxide. The second catalyst includes transition metal oxide particles in a second ceramic layer supported on a second substrate. The second catalyst is capable of oxidizing $NO+O_2$ to $NO_2$ during a first time period having a lean emission and having a temperature exceeding 75° C. The first substrate is disposed upstream and adjacent to the second substrate.

A method of using the hybrid oxidation catalyst system includes oxidizing the hydrocarbons and carbon monoxide in an engine emission using a first catalyst. The first catalyst includes noble metal particles supported on a first ceramic layer. The noble metal particles have a ratio of non-palladium noble metal content to palladium metal content in the first catalyst ranging from 0 to 5. The method also includes oxidizing the NO in the emissions resulting from interaction with the first catalyst to form $NO_2$ with a second catalyst. The second catalyst includes transition metal oxide particles supported on a second ceramic layer. The first catalyst is disposed upstream and adjacent to the second catalyst.

DETAILED DESCRIPTION OF EMBODIMENTS

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention. Practice within the numerical limits stated should be desired and independently embodied.

The description of a group or class of materials as suitable for a given purpose in connection with the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Figure 1:
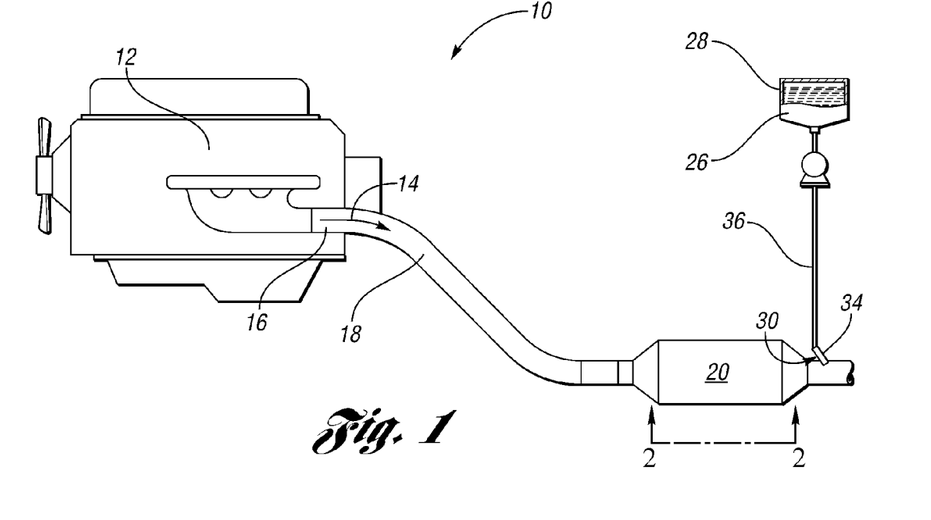
FIG. 1 schematically illustrates an emissions remediation system according to certain embodiments.

Referring now to FIG. 1, an exemplary remediation device is schematically illustrated. Remediation device 10 receives an exhaust 14 from an engine 12. Exhaust 14 enters the remediation device 10 at an intake 16 adjacent to engine 12. Exhaust 14 travels in an exhaust conduit 18, for example, a pipe, having a longitudinal axis. A portion of conduit 18 connects intake 16 with a hybrid oxidation catalyst 20. In the illustrated embodiment, a reductant 26, such as a reducing agent like urea or diesel emission fluid (DEF), is stored in a storage vessel 28 and delivered to a reductant delivery system 30 by a conduit 36. Delivery system 30 is coupled to a portion of conduit 18 through an aperture 34 situated downstream of hybrid oxidation catalyst 20.

Figure 2:
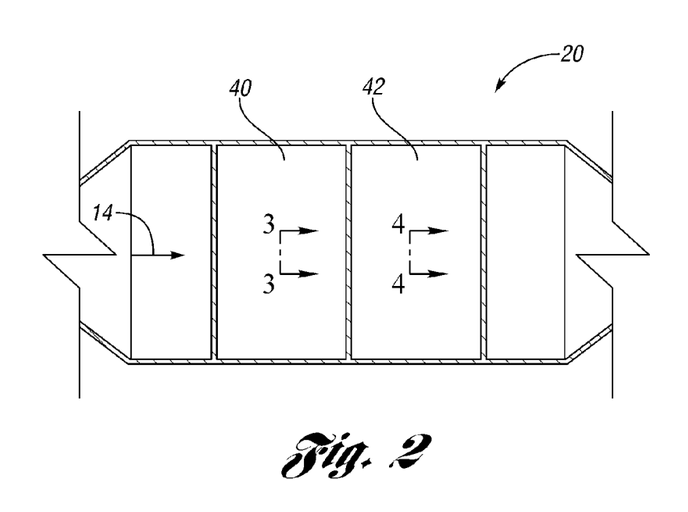
FIG. 2 schematically illustrates a hybrid oxidation catalyst according to certain embodiments.

Referring to FIG. 2, hybrid oxidation catalyst 20 comprises a noble metal catalyst 40 and a base metal oxide catalyst 42. Noble metal catalyst 40 is situated upstream of base metal oxide catalyst 42, and preferably, adjacent to base metal oxide catalyst 42.

Figure 6A:
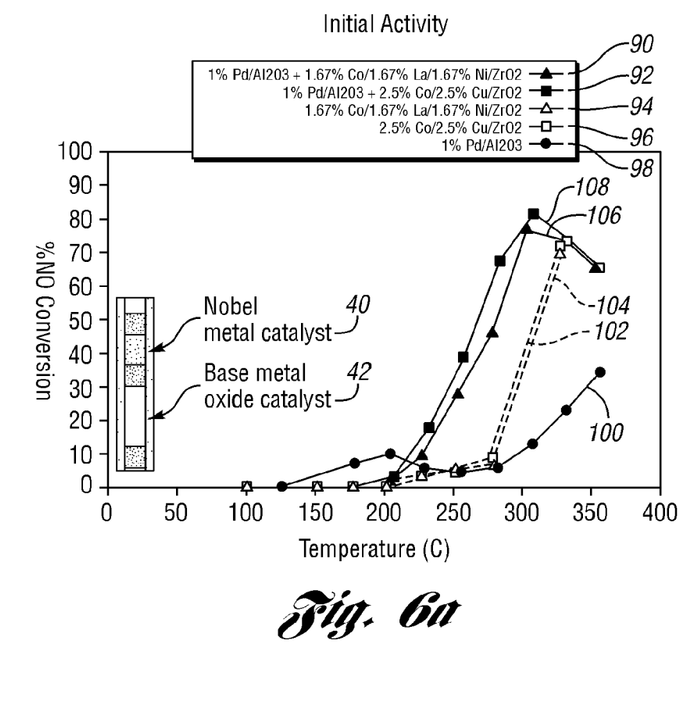
FIGS. 6a and 6b graphically illustrate emissions remediation according to certain embodiments.
Figure 6B:
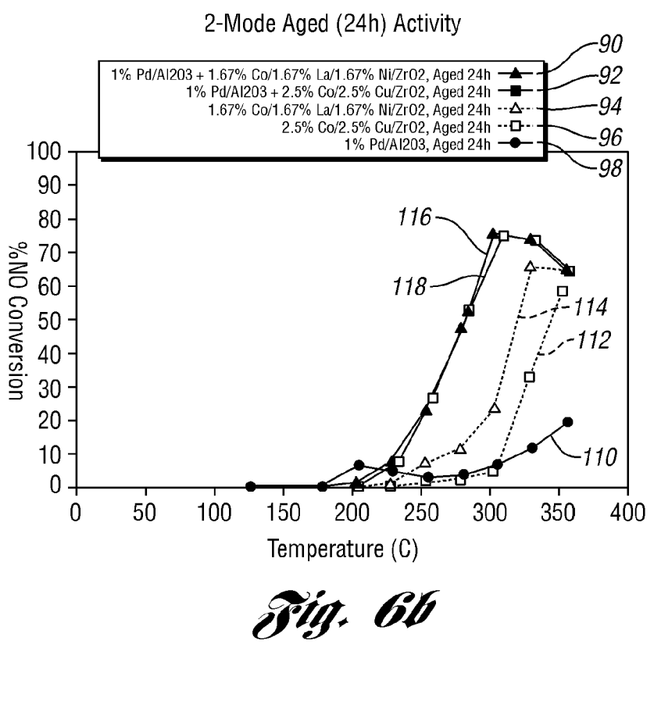
Figure 7A:
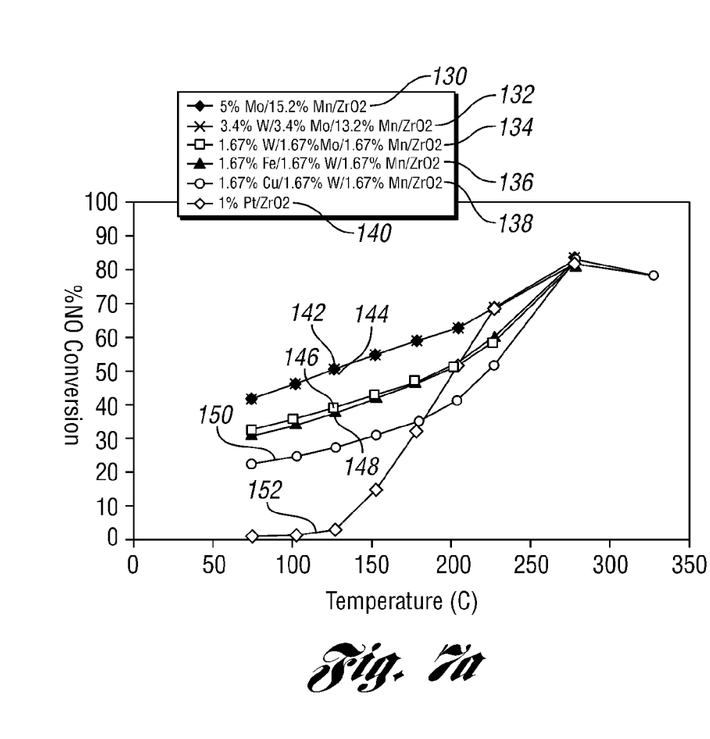
FIGS. 7a and 7b graphically illustrate emissions remediation according to certain embodiments.
Figure 7B:
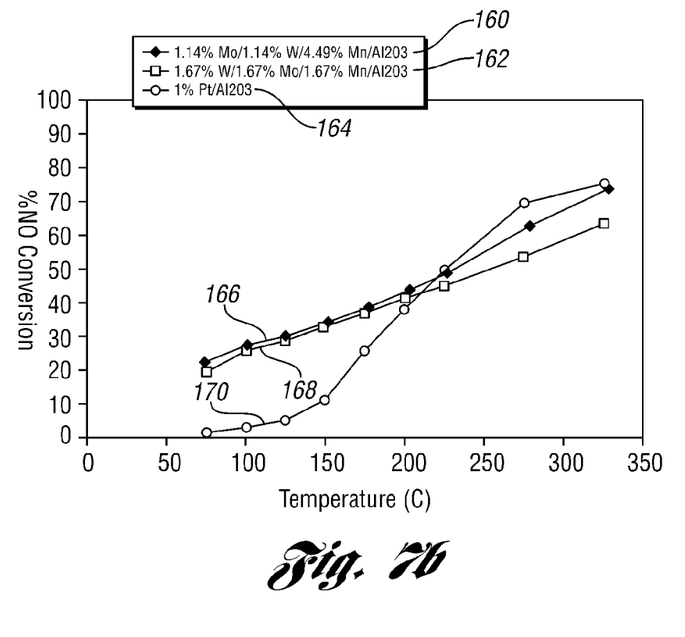

While two catalysts 40 and 42 are illustrated, it is understood that there may be more than one catalyst sub-unit in either or both catalyst. It is further understood that catalysts 40 and 42 may be situated as zones on a single substrate. For a non-limiting example, base metal oxide catalyst 42 may comprise a low temperature active catalyst, such as illustrated in FIGS. 7a and 7b, and a high temperature active catalyst, such as illustrated in FIGS. 6a and 6b.

Figure 3:
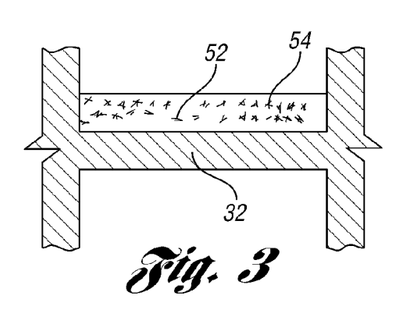
FIG. 3 schematically illustrates a fragmentary cross-section of a noble metal catalyst along axis 3-3 of FIG. 2.

Regarding FIG. 3, noble metal catalyst 40 is schematically illustrated in a fragmentary cross-sectional view along axis 3-3 of FIG. 2. Substrate 32 is coated with a ceramic washcoat layer 52 which has noble metal particles 54, such as microcrystallites, applied by an embedding process such as impregnation followed by calcination.

Substrate 32 may comprise any ceramic substrate known in the art. Non-limiting examples includes 400 cells per square inch substrate having a composition of cordierite, mullite, alumina, clay, and/or steatite.

It is understood that substrate 32, in certain embodiments, includes a metal substrate, such as a crenulated metal foil, which is spirally wound. Substrate 32, in yet other embodiments, is formed with a cell density ranging from 10 to 600 cells per square inch.

Adjacent to substrate 32 is the washcoat layer 52 which in certain embodiments, may comprise a ceramic material or a material that resists deterioration at temperatures up to 700° C. Non-limiting examples of the ceramic support material may include alumina, zirconia and other metal oxides.

In at least one embodiment, a high surface area ceramic support material that enhances dispersion of the noble metal is preferred, such as alumina.

In at least one embodiment, the noble metal particles 54 consist essentially of palladium in order to provide a relatively inexpensive hydrocarbon and carbon monoxide oxidation catalyst. In at least one embodiment, a ratio of combined non-palladium noble metals content to palladium metal content ranges from 0-5. In certain embodiments, the ratio of combined non-palladium noble metals content to palladium metal content ranges from 0 to 0.2. In another embodiment, the ratio of combined non-palladium noble metal content to palladium content ranges from 0.05 to 0.1.

In another embodiment, the noble metal particles 54 include one or more of platinum, palladium, rhodium, and gold particles.

In at least one embodiment, the amount of noble metal in noble metal catalyst 40 ranges from 100 ppm by weight of the washcoat 52 to 3% by wt. of the washcoat 52. In at least one other embodiment, the amount of noble metal in noble metal catalyst 40 ranges from 0.1 wt. % of the washcoat 52 to 0.5 wt. % of the washcoat 52. In yet another embodiment, the amount of the noble metal in noble metal catalyst 40 ranges from 0.5 wt. % of the washcoat 52 to 1 wt. % of the washcoat 52.

In yet another embodiment, the noble metal catalyst 40 has at least an amount of palladium sufficient to oxidize at least 1,000 parts per million of hydrocarbon, measured as C-1, substantially effective to prevent hydrocarbon and/or carbon monoxide inhibition of base metal oxide catalyst 42. While not wishing to be bound by any one particular theory, in at least one embodiment, inhibition is generally regarded as resulting from one gas component interfering with a reaction of a second gas component that would otherwise occur in the absence of the first component. It is believed that this occurs because the first component occupies sites on the catalyst surface that are required for a second gas component to react with another reactant on the catalyst surface. Inhibition depends only on the instantaneous concentration of the interfering component. In certain embodiments, the amount of noble metal effective substantially to prevent hydrocarbon and/or carbon monoxide inhibition may be measured by any statistically significant decrease in NO oxidation using the test method described in the examples.

Figure 4:
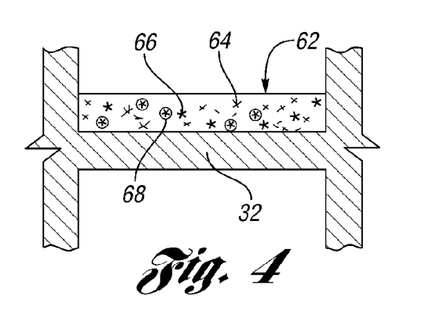
FIG. 4 schematically illustrates a fragmentary cross-section of a base metal oxide catalyst along axis 4-4 of FIG. 2.

FIG. 4 illustrates base metal oxide catalyst 42 in fragmentary cross-section along axis 4-4 of FIG. 2. Base metal oxide catalyst 42 includes substrate 32. A washcoat 62 is applied to substrate 32. In one embodiment, washcoat 62 is composed, optionally, of a refractory, high-surface area ceramic powder 64 that serves as support for particles of catalytic base metal oxide 66 and, optionally, a promoter 68. Without wishing to be tied to a particular theory of the function of a support, it is generally believed that the primary function of a high surface area support is to facilitate dispersion of the catalytic species, and thus, exposing a greater surface area of catalytic material. Non-limiting examples of high-surface area support powder 64 comprising washcoat 62 include oxides of aluminum, magnesium, silicon, titanium, zirconium and cerium. It should be understood that one or more high-surface area support powder 64 having more than one metal in the compound or non-stoichiometric amounts of oxygen is contemplated within the scope and spirit of embodiments. It should be further understood that a non-oxide composition of high-surface area support powder 64 materials is contemplated within the scope and spirit of embodiments.

In at least one embodiment, catalytic base metal oxide particles 66 comprise oxides of cobalt, manganese, iron, copper, nickel, lanthanum, cerium, scandium, titanium, vanadium, chromium, yttrium, niobium, tantalum, tungsten, rhenium, bismuth, transition metals, actinides, and/or lanthanides. Catalytic base metal oxide particles 66, in at least one embodiment, are deposited onto a support by impregnation of the support with a solution of a salt or salts that are subsequently decomposed at high temperatures in an oxidizing atmosphere to form the base metal oxide particles 66. It should be understood that catalytic base metal oxide particles 66 may be composed of single oxides or mixed oxides in the form of crystalline and/or amorphous materials, and that materials with non-stoichiometric amounts of oxygen are contemplated within the scope and spirit of the embodiments. It should also be understood that other methods for depositing catalytic base metal oxide particles 66 onto the support known in the art are contemplated within the scope and spirit of the embodiments. Further, it should be understood that the washcoat 62 is optional, and catalytic base metal oxide particles 66 may be deposited directly onto the substrate 32 and not dispersed onto a support.

In at least one embodiment, the washcoat 62 optionally includes promoter 68. In at least one embodiment, proximity of promoter 68 to catalytic base metal oxide particles 66 serves to enhance the catalytic activity of the catalytic base metal oxide particles 66, while possessing little or no catalytic activity. While not wishing to be bound to a particular theory, promoters are generally regarded as serving as a storage reservoir for particular reaction intermediate products or reactants and facilitating the efficient transfer of said components to or from reaction sites. Promoters may be disposed with respect to the catalytic base metal oxide particles 66 in several ways, including, but not limited to, as discrete particles or as coatings on support materials or as the surfaces of support materials. Non-limiting examples of promoters include $ZrO_2$ supports and $Al_2O_3$ supports pre-treated with $MoO_3$ or $WO_3$. In at least one embodiment, the high-surface area ceramic powder 64 provides promoter functionality.

Non-limiting examples of promoters include using $WO_3$ or $MoO_3$ with manganese oxides which results in a higher catalytic activity of the manganese oxide with respect to oxidation of NO as illustrated in FIGS. 7a and 7b. In other embodiments, promoters include Fe oxides and Cu oxides.

In certain embodiments, the catalytic effect arises from synergistic contributions of more than one, even all components of base metal oxide catalyst 42. It is understood that the catalytic effects may be aggregated for components in base metal oxide catalyst 42 without fractionalizing functionality by component and not exceed the scope or spirit of the embodiments contemplated herein.

In at least one embodiment, the amount of Mo-containing base metal oxide comprises less than 40 wt. % of the washcoat. In yet another embodiment, the amount of Mo-containing base metal oxide ranges from 100 ppm by weight to 40 wt. %. In another embodiment, the amount of Mo-containing base metal oxide ranges from 0.3 wt. % to 20 wt. %. In yet another embodiment, the amount of Mo-containing base metal oxide ranges from 1 wt. % to 10 wt. %.

In at least one embodiment, the amount of W-containing base metal oxide is less than 40 wt. % of the washcoat. In another embodiment, the amount of W-containing base metal oxide ranges from 100 ppm by weight to 40 wt. %. In yet another embodiment, the amount of W-containing base metal oxide ranges from 0.3 wt. % to 20 wt. %. In yet a further embodiment, the amount of W-containing base metal oxide ranges from 1 wt. % to 10 wt. %.

In at least one embodiment, the amount of Fe-containing base metal oxide is less than 40 wt. % of the washcoat. In yet another embodiment, the amount of Fe-containing base metal oxide ranges from 100 ppm by weight % to 40 wt. %. In yet another embodiment, the amount of Fe-containing base metal oxide ranges from 0.3 wt. % to 20 wt. %. In yet another embodiment, the amount of Fe-containing base metal oxide ranges from 1 wt. % to 10 wt. %.

In at least one embodiment, the amount of Cu-containing base metal oxide is less than 40 wt. %. In another embodiment, the amount of Cu-containing base metal oxide ranges from 100 wt. % to 40 wt. %. In another embodiment, the amount of Cu-containing base metal oxide ranges from 0.3 wt. % to 20 wt. %. In another embodiment, the amount of Cu-containing base metal oxide ranges from 1 wt. % to 10 wt. %.

In at least one embodiment, the amount of Mn-containing base metal oxide is less than 40 wt. % of the washcoat. In another embodiment, the amount of Mn-containing base metal oxide range from 100 ppm to 40 wt. %. In yet another embodiment, the amount of Mn-containing base metal oxide ranges from 0.3 wt. % to 20 wt. %. In yet a further embodiment, the amount of Mn-containing base metal oxide ranges from 1 wt. % to 10 wt. %.

In yet other embodiments, the support comprising washcoat 62 may have relatively high surface areas. In at least one embodiment, the support comprising washcoat 62 has a surface area ranging from 10 $m^2/g$ to 200 $m^2/g$ in a fresh state.

One or more base metal oxide particles 64, 66 may be included in washcoat 62. Non-limiting examples of particles 64, 66 include reducible base-metal oxides. Preferred base metal oxides include $CoO_x$, and/or $MnO_x$ in certain embodiments. In some embodiments, base metal oxide particles 64, 66 are also preferred that are comprised of metal that has an incomplete d-electron subshell in the elemental state of the metal.

In at least one embodiment, the amount of base metal oxide particles 64 and 66 in base metal catalyst 42 ranges from 100 ppm by weight of washcoat 62 when measured as a metal oxide content to 40 wt. % of washcoat 62. In another embodiment, the amount of base metal oxide particles 64 and 66 in base metal catalyst 42 ranges from 1 wt. % of washcoat 62 to 10 wt. % of washcoat 62.

It should be understood that while two different types of base metal oxide particles 64, 66 are illustrated, in certain embodiments, there may be only one base metal type or there may be a plurality of base metal types comprising the particles.

It should be understood that either washcoat 52 and/or washcoat 62 may comprise both noble metal particles 54 and base metal oxide particles 64 and/or 66.

Figure 5A:
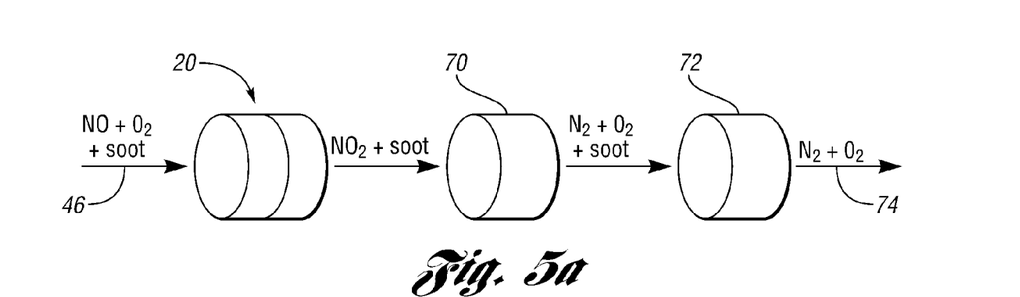
FIGS. 5a, 5b, and 5c schematically illustrate configurations of emissions remediation systems according to certain embodiments.
Figure 5B:
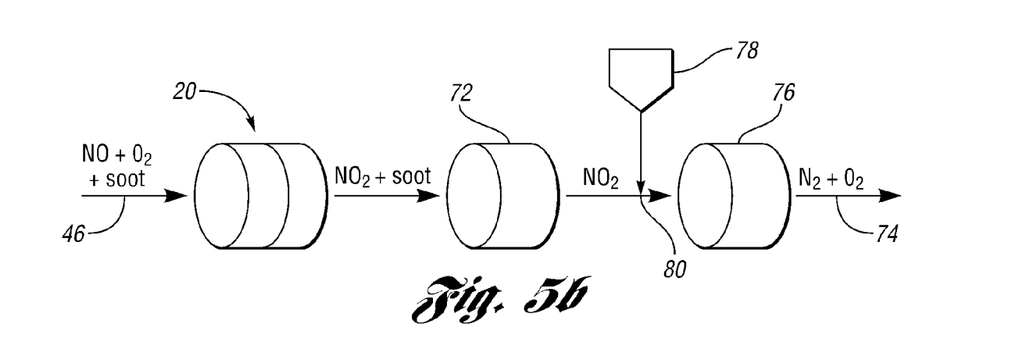
Figure 5C:
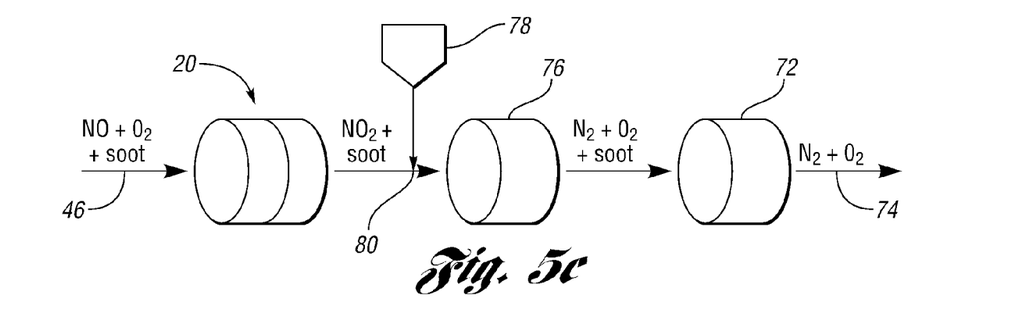

Regarding FIGS. 5a-5c, three configurations of emission remediation systems according to certain embodiments are schematically illustrated. In FIG. 5a, hybrid oxidation catalyst 20 converts a portion of $NO+O_2$ to $NO_2$, which is then provided to a $NO_x$ trap 70. In certain embodiments, $NO_x$ trap 70 uses hybrid oxidation catalyst 20 to produce $NO_2$ which is stored as nitrates on the $NO_x$ trap 70 for later reduction to nitrogen and oxygen during rich engine operation having a stoichiometric ratio of oxygen to fuel of less than 15. The nitrogen and oxygen is then provided to a soot filter 72 before being released to the atmosphere 74.

In FIG. 5b, in certain embodiments, hybrid oxidation catalyst 20 receives the $NO+O_2$ emission from the engine and converts a portion to $NO_2$. The $NO_2$ is provided to soot filter 72 to react with soot and provide a cleaned emission. The emission cleaned of soot and containing residual $NO_x$ exits the soot filter 72 and passes to a selective catalytic reduction (SCR) catalyst 76. Prior to entering SCR catalyst 76, a reductant such as urea or ammonia is introduced to the cleaned emission $NO_x$ from a reductant source 78 at an introduction port 80. The cleaned emission containing the reductant and $NO_x$ is remediated by the SCR catalyst 76 and released to the atmosphere 74.

The hybrid oxidation catalyst 20—soot filter 72—SCR catalyst 76 configuration of FIG. 5b uses the $NO_2$ produced by the hybrid oxidation catalyst 20 to aid combustion of soot stored on soot filter 72, such as a diesel particulate filter (DPF), during regeneration of the remediation system 10.

In FIG. 5c, the unremediated emission containing $NO+O_2$ enters hybrid oxidation catalyst 20 which converts a portion of the emission to $NO_2$. In at least one embodiment, the $NO_2$ is directed to the SCR catalyst 76. The $NO_2$ emission is introduced to the reductant from a reservoir 78 at an introduction port 80 prior to entering SCR catalyst 76. SCR catalyst 76 with the reductant remediates the $NO_2$ to nitrogen and oxygen which is passed to soot filter 72. The nitrogen and oxygen is cleaned in soot filter 72 and released to the atmosphere 74.

Hybrid oxidation catalyst 20—SCR catalyst 76—filter 72 configuration in FIG. 5c benefits from $NO_2$ produced by the base metal oxide catalyst 42 to improve the low-temperature conversion of $NO_x$ to nitrogen and oxygen by the SCR 76.

Turning now to FIGS. 6a and 6b, embodiments of configuration of noble metal catalyst 40 and base metal oxide catalyst 42 are shown when tested with a standard feed gas by methods known to those skilled in the art.

EXAMPLES

Example 1

Five samples are prepared. Sample one 90 includes noble metal catalyst 40 having 1 wt. % palladium on an alumina support. Base metal oxide catalyst 42 comprises 1.67 wt. % of cobalt oxide with 1.67 wt. % of lanthanum oxide, and 1.67 wt. % of nickel oxide on a zirconia support. A second sample 92 combined a first catalyst comprising 1 wt. % palladium supported on alumina with a second catalyst comprising 2.5 wt. % cobalt oxide, 2.5 wt. % copper oxide supported on a zirconia support. A base metal oxide catalyst 94 to be used as a control includes 1.67 wt. % cobalt oxide, 1.67 wt. % lanthanum oxide, and 1.67 wt. % nickel oxide on a zirconia support. Control sample 96 has a 2.5 wt. % cobalt oxide and a 2.5 wt. % copper oxide on a zirconia support. A noble metal catalyst control 98 has 1 wt. % palladium on an alumina support.

A feed gas is provided to the samples. The feed gas composition is 1,750 parts per million propene as C-1, 450 parts per million volume of nitric oxide, 8 vol. % oxygen, 6 vol. % carbon dioxide, and 2,500 parts per million volume of carbon monoxide, and 2 vol. % water. The feed gas composition is intended to simulate a lean exhaust gas stream and is a non-limiting example of a gas stream from an engine configuration under a set of operating conditions in at least one embodiment. The feed gas is directed to test configurations having either the hybrid oxidation catalyst comprised of 100 milligrams of noble metal catalyst having palladium supported on alumina and 100 milligrams of base metal oxide catalyst supported on zirconia, the base metal oxide catalyst control samples 94, 96, or to the noble metal catalyst control 98. The test measures the percent $NO_2$ produced as a function of temperature. The palladium control 98 and the base metal oxide controls 94 and 96 are graphed according to graph lines 100, 104, and 102, respectively. The percent NO conversion of each of the controls 94, 96, and 98 are less than the percent conversion of the noble metal catalyst 40 combined with base metal oxide catalyst 42 as given by the configurations 90 and 92 which are illustrated as graph lines 106 and 108, respectively, when the temperature exceeds 225° C. and the catalysts are fresh.

In another embodiment, catalyst configurations 90, 92, 94, 96, 98 are exposed to a two-mode aging treatment for 24 hours when the temperature alternates between 300° C. and 700° C. The percent NO conversion of the feed gas disclosed above is measured. The results for controls 94, 96, 98 are illustrated by graph lines 110, 114, and 112, respectively. Above 225° C. when the catalysts are aged, the combined noble metal catalyst 40 and base metal oxide catalyst 42 configurations 90 and 92 provide substantially better NO conversion as shown in graph lines 116 and 118, than do the controls as shown in graph lines 110, 112, or 114.

Example 2

Six additional samples are prepared. Sample one 130 includes 5 wt. % molybdenum-containing base metal oxide and 15.2 wt. % manganese-containing base metal oxide supported on zirconia.

Sample two 132 comprises 3.4 wt. % tungsten-containing base metal oxide, 3.4 wt. % molybdenum-containing base metal oxide, and 13.2 wt. % manganese-containing base metal oxide supported on zirconia.

Sample three 134 comprises 1.67 wt. % tungsten-containing base metal oxide, 1.67 wt. % molybdenum-containing base metal oxide, and 1.67 wt. % manganese-containing base metal oxide supported on zirconia.

Sample four 136 comprises 1.67 wt. % iron-containing base metal oxide, 1.67 wt. % tungsten-containing base metal oxide, and 1.67 wt. % manganese-containing base metal oxide supported on zirconia.

Sample five 138 comprises 1.67 wt. % copper-containing base metal oxide, 1.67 wt. % tungsten-containing base metal oxide, and 1.67 wt. % manganese-containing base metal oxide supported on zirconia.

Sample six 140 comprises a control having 1 wt. % platinum supported on zirconia.

As shown in FIG. 7*a*, all of the base metal oxide-containing catalysts 130, 132, 134, 136, and 138 exhibit significantly better nitrogen oxide conversion relative to the platinum control sample six 140 between 75° C. and at least 175° C., 200° C. and 225° C. depending upon formulation of the base metal oxide catalyst. These graph data are shown on graph lines 142, 144, 146, 148, 150 for base metal oxide-containing catalysts 130, 132, 134, 136 and 138, respectively, versus control sample six 140 shown on graph line 152. In the test illustrated in FIG. 7*a*, the feed gas was 500 ppm NO+8 vol. % $O_2$.

Example 3

As illustrated in FIG. 7*b*, three samples are prepared. Sample one 160 includes 1.14 wt. % molybdenum-containing base metal oxide, 1.14 wt. % tungsten-containing base metal oxide, and 4.49 wt. % manganese-containing base metal oxide supported on alumina. Sample two 162 comprises 1.67 wt. % tungsten-containing base metal oxide, 1.67 wt. % molybdenum-containing base metal oxide and 1.67 wt. % manganese-containing base metal oxide supported on alumina. Sample three 164 is a control sample comprising 1 wt. % platinum supported on alumina. The feed gas for this experiment is 500 ppm NO+8 vol. % $O_2$.

Base metal oxide-containing catalysts supported on alumina 160 and 162 show a statistically significant improvement in nitrogen oxide conversion as viewed on graph lines 166 and 168, respectively, relative to the platinum control graph line 170 when tested above 75° C. and below 225° C.

While the best mode for carrying out the invention has been described in detail, those familiar with the art to which this invention relates will recognize various alternative designs and embodiments for practicing the invention as defined by the following claims.

What is claimed:

1. A hybrid oxidation catalyst system for use with remediating a lean emission from a vehicle, the catalyst system comprising:
a noble metal catalyst having noble metal particles in a first ceramic layer disposed on a first substrate; and
a base metal oxide catalyst disposed downstream of the noble metal catalyst, the base metal oxide catalyst comprising base metal oxide particles in a second ceramic layer disposed on a second substrate wherein the noble metal catalyst is effective to substantially prevent hydrocarbon or carbon monoxide inhibition of the base metal oxide catalyst when enhancing the $NO+O_2$ conversion effectiveness of the base metal oxide catalyst and the base metal oxide catalyst includes at least one of an amount of Mo ranging from 1.14 wt. % to 5 wt. % or W ranging from 1.67 wt. % to 3.4 wt. % of the base metal oxide catalyst remediating at least 20% of NO at temperatures ranging from 125° C. to 150° C.

2. The catalyst system of claim 1, wherein the noble metal particles include palladium metal particles having a ratio of total non-palladium noble metal content to palladium metal content ranging from 0 to 5.

3. The catalyst system of claim 2, wherein the base metal oxide is selected from the group consisting of lanthanide oxides, actinide oxides, transition metal oxides, and mixed metal oxides thereof.

4. The catalyst system of claim 3, wherein the base metal oxide is promoted by a metal oxide compound where the metal of the metal oxide compound is selected from the group consisting of tungsten, molybdenum, manganese, iron, and copper, at a temperature in a range of 75° C. to 225° C. when oxidizing $NO+O_2$ to $NO_2$.

5. The catalyst system of claim 1, wherein the noble metal particles consist essentially of palladium.

6. The catalyst system of claim 1, further comprises a promoter disposed in the base metal oxide catalyst enhancing the catalytic activity of the base metal oxide catalyst.

7. The catalyst system of claim 1, wherein the base metal oxide particles include particles of a first base metal oxide and a second base metal oxide.

8. The catalyst system of claim 1, wherein the noble metal catalyst is supported on a first substrate and the base metal oxide catalyst is supported on a second substrate, the first substrate being disposed adjacent to the second substrate.

9. The catalyst system of claim 1, wherein the noble metal catalyst comprises a palladium composition ranging from 100 ppm of palladium of the first ceramic layer to 3 wt. % of palladium of the first ceramic layer and the base metal oxide catalyst consists essentially of base metal oxide particles in the second ceramic layer.

10. The catalyst system of claim 1, wherein the base metal oxide catalyst comprises a total transition metal oxide composition having a metal oxide content when measured as a metal oxide ranging from 1 wt. % of transition metal to 10 wt. % of transition metal in the second ceramic layer.

11. The catalyst system of claim 1, wherein the first ceramic layer and second ceramic layer comprise a single washcoat having noble metal particles and base metal oxide particles.

12. The catalyst system of claim 1, further comprising:
a reductant source disposed downstream of and in fluid communication with the base metal oxide catalyst;
a selective catalytic reduction (SCR) catalyst disposed downstream of and in fluid communication with the reductant source; and
a soot filter disposed downstream of the base metal oxide catalyst and in fluid communication with the SCR catalyst.

13. A hybrid oxidation catalyst system for use with remediating a lean emission from a vehicle, the catalyst system comprising:
a first catalyst comprising palladium particles in a first ceramic layer supported on a first substrate, the first catalyst being capable of oxidizing hydrocarbons and carbon monoxide; and
a second catalyst comprising transition metal oxide particles and a promoter, in a second ceramic layer supported on a second substrate, the second catalyst being capable of oxidizing $NO+O_2$ to $NO_2$ during a time period having a lean emission, the first substrate being disposed upstream and adjacent to the second substrate, wherein the second catalyst includes at least one of an amount of Mo ranging from 1.14 wt % to 5 wt % or W ranging from 1.67 wt % to 3.4 wt. % of the second catalyst and the system is capable of converting at least 20% an amount of NO to $NO_2$ at a temperature ranging from 75° C. to 225° C. a first time period.

14. The catalyst system of claim 13, further comprising:
a $NO_x$ trap disposed downstream of and in fluid communication with the second catalyst for storing $NO_2$ as a nitrate during the first time period; and
a soot filter disposed downstream of and in fluid communication with the $NO_x$ trap.

15. The catalyst system of claim 13, further comprising:
a soot filter disposed downstream of the second catalyst, the filter being capable of using $NO_2$ produced by the second catalyst to oxidize soot during a second time period having a rich emission;
a reductant source disposed downstream of and in fluid communication with the soot filter; and
a selective catalytic reduction (SCR) catalyst disposed downstream of the reductant source.

16. The catalyst system of claim 13, further comprising:
a reductant source disposed downstream of and in fluid communication with the second catalyst;
a selective catalytic reduction (SCR) catalyst disposed downstream of and in fluid communication with the reductant source, the SCR catalyst being capable of improving a low-temperature $NO_x$ oxidation conversion percentage when the system has a temperature exceeding 75° C.; and
a soot filter disposed downstream of and in fluid communication with the SCR catalyst.

17. The catalyst system of claim 13, wherein the first substrate and the second substrate comprise zones on the same substrate.

18. The catalyst system of claim 13, wherein the palladium particles have a metal content ranging from 0.1 wt. % of the first catalyst to 3 wt. % of the first catalyst.

19. The catalyst system of claim 13, wherein the transition metal oxide particles comprise metal selected from the group consisting of cobalt, copper, nickel, lanthanum, molybdenum, tungsten, iron and manganese.

* * * * *